United States Patent
Schimpfky et al.

(10) Patent No.: US 8,782,220 B2
(45) Date of Patent: Jul. 15, 2014

(54) SOFTWARE PRODUCT MANAGEMENT THROUGH THE CLOUD

(75) Inventors: Rolf Schimpfky, Dresden (DE); Richard Pahner, Dresden (DE); Heiko Braumann, Dresden (DE); Thomas Dubiel, Dresden (DE); Mario Mueller, Dresden (DE)

(73) Assignee: SAP AG, Walldorf (DE)

( * ) Notice: Subject to any disclaimer, the term of this patent is extended or adjusted under 35 U.S.C. 154(b) by 177 days.

(21) Appl. No.: 13/525,841

(22) Filed: Jun. 18, 2012

(65) Prior Publication Data

US 2013/0339518 A1 Dec. 19, 2013

(51) Int. Cl.
*G06F 15/173* (2006.01)
*G06F 15/16* (2006.01)

(52) U.S. Cl.
USPC .......................................... 709/224; 709/246

(58) Field of Classification Search
CPC ....................................................... H04L 43/02
USPC .................................. 709/224, 246
See application file for complete search history.

(56) References Cited

U.S. PATENT DOCUMENTS

| | | | | |
|---|---|---|---|---|
| 5,435,147 | A * | 7/1995 | Mochizuki et al. | 62/175 |
| 7,516,277 | B2 * | 4/2009 | Kilian et al. | 711/130 |
| 8,176,137 | B2 * | 5/2012 | Cornelius et al. | 709/207 |
| 2002/0007359 | A1 * | 1/2002 | Nguyen | 707/4 |
| 2005/0120113 | A1 * | 6/2005 | Bunch et al. | 709/224 |
| 2005/0188083 | A1 * | 8/2005 | Biondi et al. | 709/224 |
| 2012/0191651 | A1 * | 7/2012 | Irizarry, Jr. | 707/634 |
| 2012/0260124 | A1 * | 10/2012 | Yuan et al. | 714/4.11 |

* cited by examiner

*Primary Examiner* — Lance L Barry
(74) *Attorney, Agent, or Firm* — Fountainhead Law Group PC

(57) ABSTRACT

Status of software product(s) may be monitored through the cloud by Extract, Transform, Load (ETL) of status information, in the form of business process status indicators from customer tenants. Examples of such status indicators can include a backlog of tasks to be fulfilled, or a number of business documents present in specific processing states, which describe aspects of the business application and allow an understanding of the overall status of the monitored application. A data extractor component of a customer tenant may extract and transform the status indicators from a plurality of business documents. A data import framework of a central monitoring system may in turn employ mapping to condense that heterogeneous data into a monitoring-specific simplified status model.

18 Claims, 4 Drawing Sheets

SOFTWARE PRODUCT MANAGEMENT THROUGH THE CLOUD

BACKGROUND

Embodiments of the present invention relate to cloud computing, and in particular to management of software applications through the cloud.

Unless otherwise indicated herein, the approaches described in this section are not prior art to the claims in this application and are not admitted to be prior art by inclusion in this section.

In general, a cloud computing configuration may comprise a central system (e.g. service provider cockpit) that is configured to monitor a plurality of customer tenants. Such a customer tenant may comprise a virtual machine, on which the Enterprise Resource Planning (ERP) software of a single customer may be run. Such a virtual machine can be accessed by business users via the Internet, for example with a web browser.

Customers typically run a same software version of a complex ERP solution. This ERP solution may comprise several applications belonging to different business areas. In particular instances, examples of such applications may relate to management of financial information, supply chain management information, etc.

The business process status of these different applications, may be evaluated periodically (e.g. daily or weekly). To perform this monitoring business process status may be read from different customers, and from different business areas, on a regular basis.

However, the multiplicity of different customers and different business areas needing to be monitored, can lead to compatibility issues. In particular, it can be difficult to integrate status information originating from various different customer tenants and different applications. Accordingly, there is a need in the art for systems and methods allowing management of software applications through the cloud.

SUMMARY

Status of software product(s) may be monitored through the cloud by Extract, Transform, Load (ETL) of status information, in the form of business process status indicators from customer tenants. Examples of such status indicators can include a backlog of tasks to be fulfilled, or a number of business documents present in specific processing states, which describe aspects of the business application and allow an understanding of the overall status of the monitored application. A data extractor component of a customer tenant may extract and transform the status indicators from a plurality of business documents. A data import framework of a central monitoring system, may in turn employ mapping techniques to condense that heterogeneous data into a monitoring-specific simplified status model.

An embodiment of a computer-implemented method comprises causing a data import framework of a central monitoring system, to receive through a computer network, heterogeneous indicators reflecting status of remote software applications of a plurality of customer tenants. The data import framework is caused to transform the heterogeneous indicators by condensing them into a status model. The status model is loaded into a data repository in the central monitoring system. Status of the remote software applications is displayed based upon the status model.

An embodiment of a non-transitory computer readable storage medium embodies a computer program for performing a method comprising causing a data import framework of a central monitoring system, to receive through a computer network, heterogeneous indicators reflecting status of remote software applications of a plurality of customer tenants. The method further comprises causing the data import framework to transform the heterogeneous indicators by condensing them into a status model, loading the status model into a data repository in the central monitoring system, and displaying status of the remote software applications based upon the status model.

An embodiment of a computer system comprises one or more processors and a software program executable on said computer system. The software program is configured to cause a data import framework of a central monitoring system, to receive through a computer network, heterogeneous indicators reflecting status of remote software applications of a plurality of customer tenants. The software program is further configured to cause the data import framework to transform the heterogeneous indicators by condensing them into a status model, to load the status model into a data repository in the central monitoring system, and to display status of the remote software applications based upon the status model.

In certain embodiments, condensing the heterogeneous indicators comprises mapping to a status table.

According to some embodiments, the heterogeneous indicators have been extracted from the remote software applications and transformed into an application-specific model, by respective data extractors of the plurality of customer tenants.

In particular embodiments the heterogeneous indicators comprise a backlog of tasks to be fulfilled by the remote software applications.

According to various embodiments, the heterogeneous indicators comprise a number of documents present in specific processing states in the remote software applications.

In some embodiments, the remote software application comprises an enterprise resource planning (ERP) application, and the heterogeneous status indicators relate to a plurality of business areas in the ERP application.

Particular embodiments may further comprise causing the central monitoring system to communicate information through the computer network to the customer tenant, in response to the status model.

The following detailed description and accompanying drawings provide a better understanding of the nature and advantages of particular embodiments.

DETAILED DESCRIPTION

Described herein are systems and methods allowing the management of a software product through the cloud. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
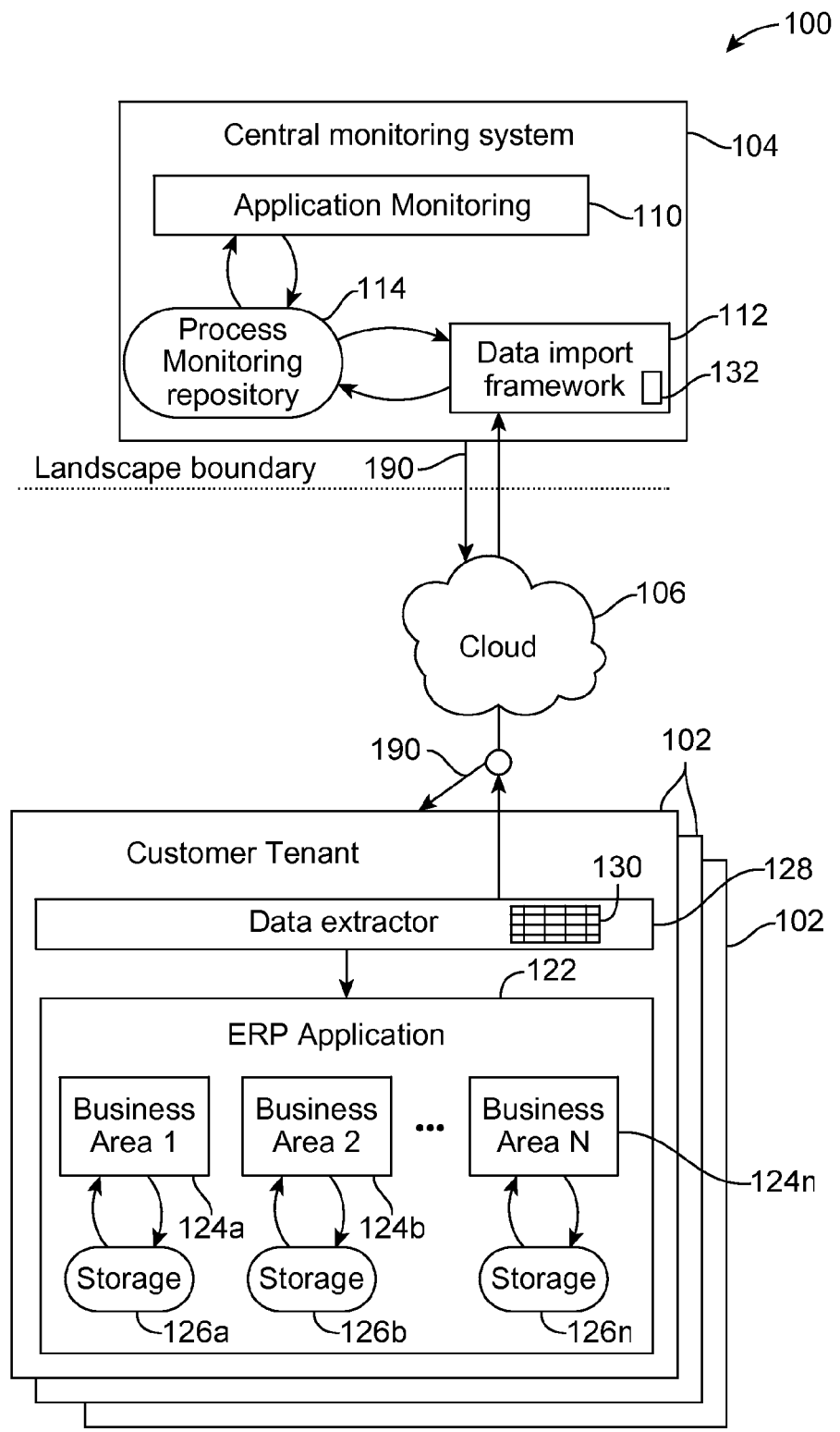
FIG. 1 shows a simplified view of an embodiment of a system configured to monitor a software product.

FIG. 1 shows a simplified view of an embodiment of a system for monitoring software application product(s) through the cloud. In particular, system 100 comprises a plurality of customer tenants 102 that are in communication with a central monitoring system 104 via a computer network 106. As used herein, the computer network is indicated as a cloud, but could encompass a computer network having wireless and/or hard-wired computer elements.

The central monitoring system 102 comprises an application monitoring engine 110 that is in communication with a data import framework 112 through a process monitoring repository 114. In operation, the data import framework 112 receives data from the plurality of customer tenants over the cloud.

In particular, each customer tenant 120 includes an ERP application 122 that may be configured to create a plurality of business documents 124a-n of various types and relating to different business areas, stored in respective data repositories (e.g. databases) 126a-n. Because of fundamental differences between the business processes to which the business documents relate, no common semantic may exist between them.

Thus according to embodiments, a data extractor component 128 of the customer tenant may function to aggregate different business documents into a common status data model. This process may be performed according to restrictions concerning the handling of sensitive customer data.

No single entity of the application may be available to be read to reveal business process status. Instead, certain indicators of process status may be defined within a general status model 130.

Such defined indicators may describe aspects of the business application, and allow for an understanding of the overall status of the monitored system. One example of such an indicator, is a backlog of tasks to be fulfilled by business users. Another example for such an indicator, is a number of business transaction documents (e.g. Sales Order, Purchase Orders, Production Lots, Delivery Notifications, Expense Records, etc), as is described further below.

Figure 2:
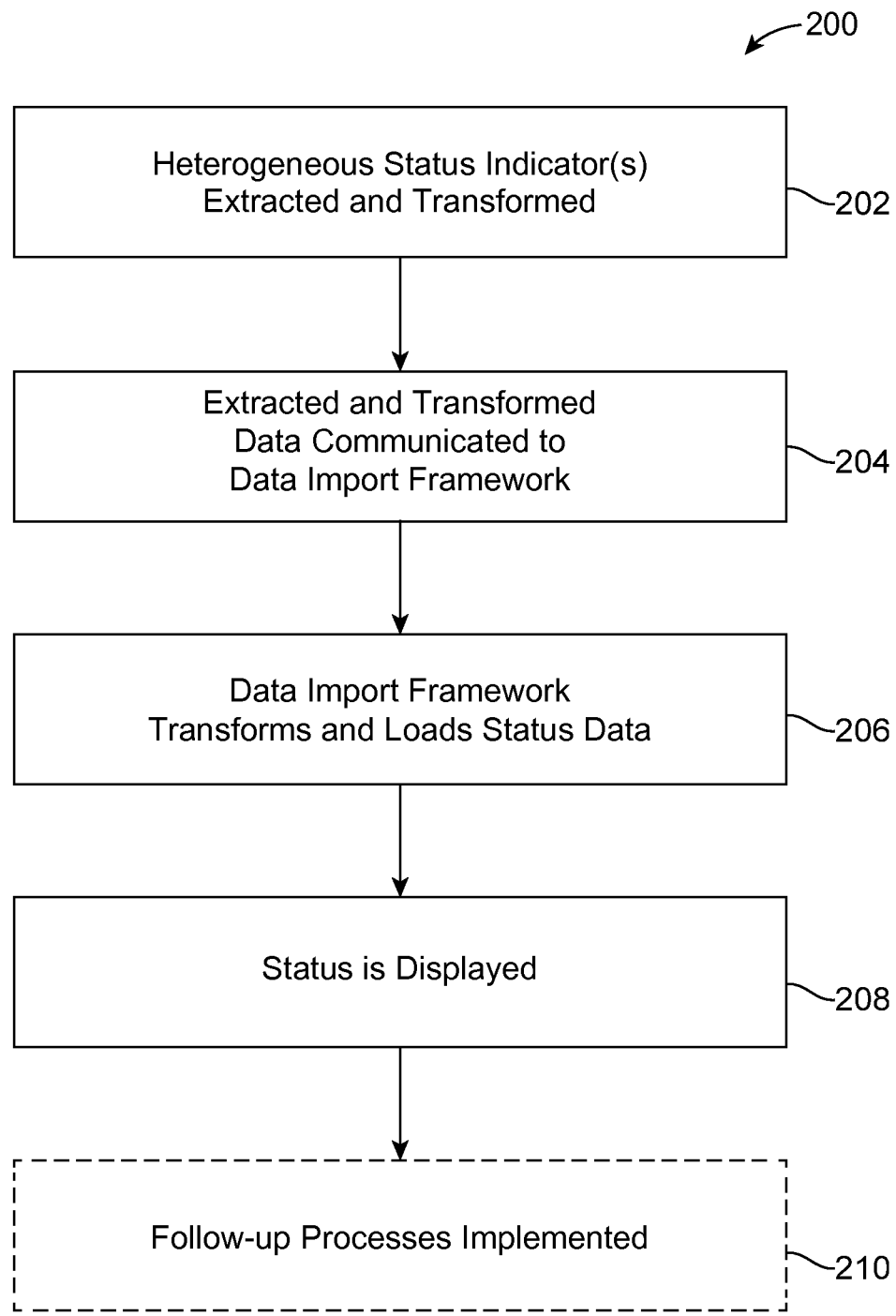
FIG. 2 is a flow diagram summarizing an embodiment of a process for monitoring a software product.

Thus in a first step 202 of FIG. 2, the data extractor component of each tenant independently reads heterogeneous application status information from the various business areas of the ERP. The data extractor component also transforms the data into a general status model. One particular embodiment of such a general status model is described below in connection with Table 1 of the Example.

Successful performance of the first (extract, transform) step, may result in the application status information from several business areas existing in a single table that reflects a general status model. Application status information stored in that single table (e.g. Table 1 of the Example), may exhibit at least two properties.

One property of the application status information stored in the table, may be its completeness from a business process status monitoring perspective. That is, from the general model the application status information can be converted back into an original state. No information relevant to monitoring (e.g. document type or application area) is lost in the general table.

Another property of the application status information stored in the table, may be that no sensitive customer data (e.g. Employee Names, Identifiers, Amounts, Comments or other details) are contained in the general table. This fulfills data privacy needs of customers.

As shown in FIG. 1, the extracted and transformed data is then communicated from the customer tenant to the computer network. Thus in a second step 204 shown in FIG. 2, the general status table is transferred to the central monitoring system for each monitored tenant independently. Standard technology for asynchronous communication (e.g. Web Services) can be used for this purpose.

The extracted and transformed data is in turn received from the cloud, by a data import framework 112 of the central monitoring system. The data import framework functions to perform additional transformation of that data, and then loads that data into the database 114 of the central monitoring system. As shown in FIG. 2, this comprises the second transformation and the loading 206.

A first condensation already happens in single customer tenant 128 to limit the transferred data volume, standardize information, and to make it anonymous. A second condensation happens during second transformation in monitoring system 132 to meet monitoring use cases. This allows fast changes on monitoring side without changing data extraction on customer tenant side.

The loading of transformed data collected on the tenants, may comprise two sub-steps. In a first sub-step, the general status table is condensed into a monitoring-specific, simplified status model 132. An example of this transformation is described below in connection with Table 2. This transformation may be surjective in nature. That is, it cannot be inverted. With this first sub-step, integration of status data from different business areas into a single status model, may be completed.

In a second sub-step, the condensed status information from various tenants is stored in a single database—the process monitoring repository 114. This repository is accessible by the application monitoring component, allowing display of status information (step 208 in FIG. 2). It may also optionally allow implementation of follow-up processes within application management (optional step 210 in FIG. 2). Thus FIG. 1 includes the arrows 190 communicating information back through the cloud to the customer tenant from the central monitoring system.

A variety of options may be available for communication back to customer. One option is manual interaction with customer via mail/phone. Another option is automatic follow up actions to address erroneous situations in tenant. Embodiments may achieve continuous improvement of application in collaboration with application development units. These improvements are deployed to customer tenants.

According to various embodiments, this business process status information can be employed in the central monitoring system to evaluate behavior of the business applications in productive use, and to understand acceptance of features by business users. As a result, business applications can be continuously improved.

By defining a system allowing reading of business process status (grouped by application), embodiments address the problem of integrating status information originating from various different customer tenants and different applications, into a single status model.

Embodiments may also consider requirements concerning compliance. For example certain embodiments may exhibit data privacy compliance, with user data or document content not being transferred.

Example

Table 1 describes a format for storing cross-application business process status information in an anonymous manner. The ERP software to be monitored includes original business data in the following business areas: "Business Area 1", "Business Area 2", "Business Area N".

Each business area may include multiple document types relevant for monitoring. Document types or status values which are not required in the status monitoring, may be ignored during data extraction.

The status of the monitored business documents, provides a summary of the business process status. This business process status is used to describe overall status of the application, allowing questions such as the acceptance of specific application aspects, to be answered. The following Table 1 shows examples with relevant status values.

TABLE 1

Business Area 1

| Document Type | $D_{1-1}$ | $S_{1-1-2}$ (Blocked) | $S_{1-1-4}$ (Completed) |
|---|---|---|---|
| Document Type | $D_{1-2}$ | $S_{1-2-1}$ (Blocked) | $S_{1-2-3}$ (In Progress) |

Business Area 2

| Document Type | $D_{2-1}$ | $S_{2-1-4}$ (Canceled) | |

...

Business Area N

| Document Type | $D_{N-1}$ | $S_{N-1-1}$ | |
| Document Type | $D_{N-2}$ | $S_{N-2-1}$ | |

Relevant document types and their relevant status values, may be appended to a single generalized status code list. Each code value can be assigned to the business area where the corresponding business document is located:

| SourceStatus | Business Area | Generalized Status (GS) |
|---|---|---|
| S1-1-2 | Business Area 1 | GS-1 |
| S1-2-1 | Business Area 1 | GS-2 |
| S2-1-4 | Business Area 2 | GS-3 |
| ... | | |
| SN-1-1 | Business Area N | GS-4 |
| SN-2-1 | Business Area N | GS-5 |

This list can be extended with the use of additional status codes.

Data may be transferred as follows. For each generalized status value, the number of corresponding documents can be determined. This information may be collected regularly on each tenant. The final data that is sent out of a tenant may look like this:

| GeneralizedStatus (GS) | Number of Documents | Business Area |
|---|---|---|
| GS-1 | 7 | Business Area 1 |
| GS-2 | 0 | Business Area 1 |
| GS-3 | 5 | Business Area 2 |
| GS-4 | 12 | ... |
| GS-5 | 23 | Business Area N |

Mapping for integration of heterogeneous business process data into the final data model is now described. This integration occurs on the central monitoring side. Such central business process monitoring may rely upon status code values.

Thus within the central monitoring tool, status information from different business areas (introduced as Status values GS-1 to GS-7 and Table 1) are mapped into a common cross-application status model having three possible states:
1 Open Document
2 Document requires Customer Action
3 Document is blocked Mapping from generalized business status to cross-application status, may be accomplished utilizing the following mapping Table 2:

TABLE 2

| Generalized Status | Central BPM Status | Business Area |
|---|---|---|
| GS-1 | 1 | Business Area 1 |
| GS-2 | 2 | Business Area 1 |
| GS-3 | 2 | Business Area 2 |
| GS-4 | 3 | Business Area ... |
| GS-5 | 1 | Business Area N |

Systems and methods according to various embodiments may offer certain benefits. For example, some embodiments may allow monitoring of business applications beyond the borders of the same tenant or customer.

Thus multiple tenants/customers can be monitored in parallel, automatically. This allows the product monitoring to consume less time.

Moreover, product monitoring may performed in the same manner. This avoids deviations in analysis results that may be caused by the "bias" of different human beings.

In addition, a tool-based approach easily allows the implementation of automated follow-up processes triggered by the analysis. This is shown in FIG. 1 as arrows 190 communicating information from the central monitoring system through the cloud to the customer tenant.

By employing an automated analysis in the manner of embodiments as described herein, the status of a monitored application may be available rapidly (e.g. in real time). This allows quick feedback on the status of the managed solution.

With such feedback being available, a continuous improvement process can be implemented. In addition, weaknesses or flaws in the monitored product can be quickly determined.

Embodiments may also allow learning about the acceptance of the monitored applications. For example a number of pending documents and/or business tasks may allow conclusions about problems in business processes which might result from application design or documentation, to be derived.

Figure 3:
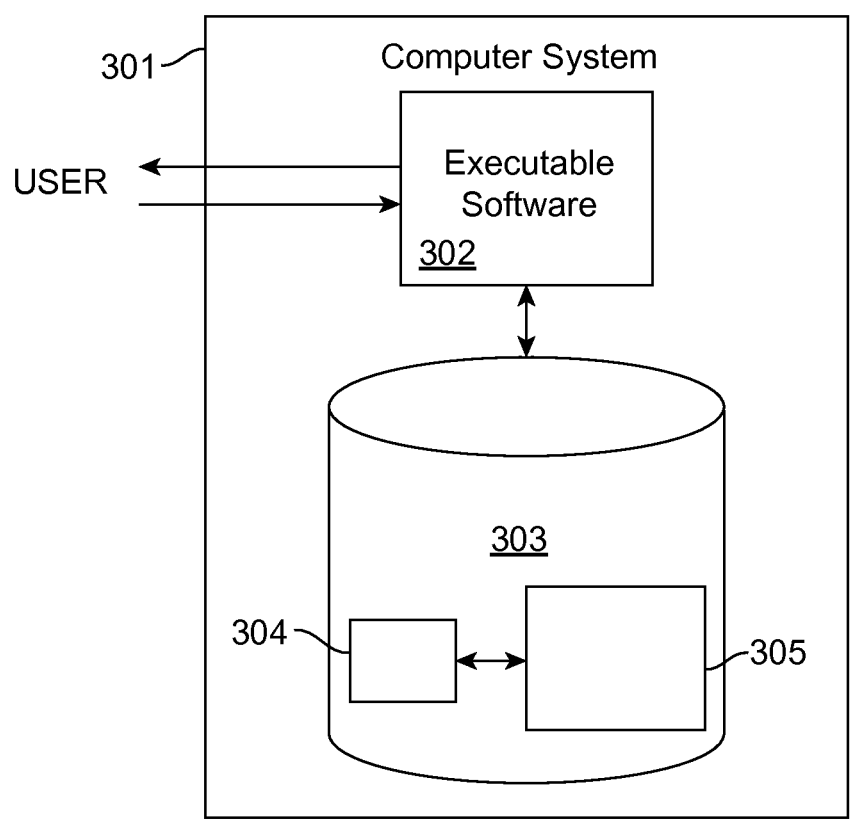
FIG. 3 illustrates hardware of a special purpose computing machine configured to perform software product monitoring according to an embodiment.

FIG. 3 illustrates hardware of a special purpose computing machine configured to perform status monitoring according to an embodiment. In particular, computer system 300 comprises a processor 302 that is in electronic communication with a non-transitory computer-readable storage medium 303. This computer-readable storage medium has stored thereon code 305 corresponding to a data import framework. Code 304 corresponds to monitoring-specific simplified status model. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 4:
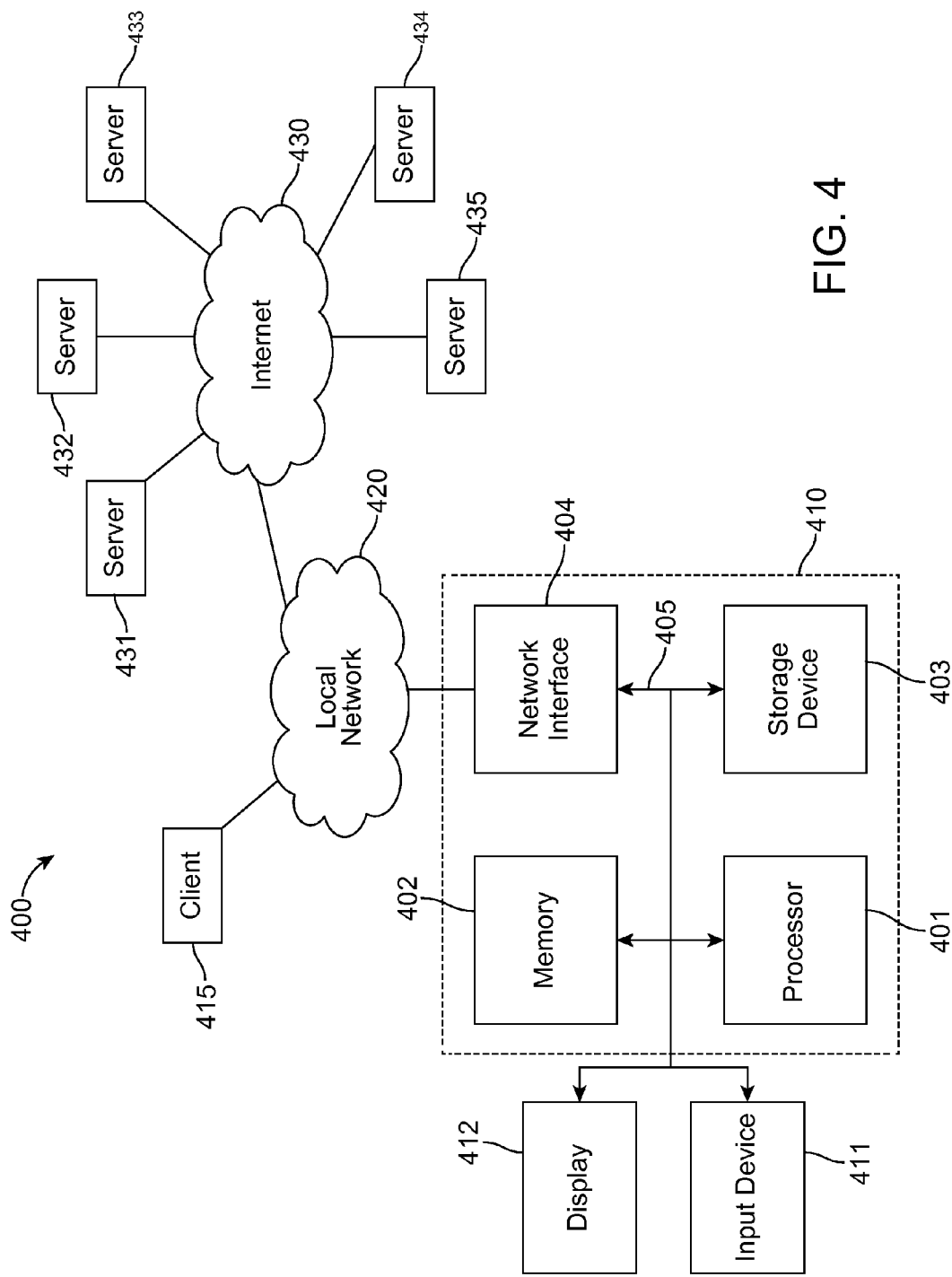
FIG. 4 illustrates an example of a computer system.

An example computer system 410 is illustrated in FIG. 4. Computer system 410 includes a bus 405 or other communication mechanism for communicating information, and a processor 401 coupled with bus 405 for processing information. Computer system 410 also includes a memory 402 coupled to bus 405 for storing information and instructions to be executed by processor 401, including information and instructions for performing the techniques described above, for example. This memory may also be used for storing variables or other intermediate information during execution of instructions to be executed by processor 401. Possible implementations of this memory may be, but are not limited to, random access memory (RAM), read only memory (ROM), or both. A storage device 403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 403 may include source code, binary code, or software files for performing the techniques above, for example. Storage device and memory are both examples of computer readable mediums.

Computer system 410 may be coupled via bus 405 to a display 412, such as a cathode ray tube (CRT) or liquid crystal display (LCD), for displaying information to a computer user. An input device 411 such as a keyboard and/or mouse is coupled to bus 405 for communicating information and command selections from the user to processor 401. The combination of these components allows the user to communicate with the system. In some systems, bus 405 may be divided into multiple specialized buses.

Computer system 410 also includes a network interface 404 coupled with bus 405. Network interface 404 may provide two-way data communication between computer system 410 and the local network 420. The network interface 404 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 404 sends and receives electrical, electromagnetic, or optical signals that carry digital data streams representing various types of information.

Computer system 410 can send and receive information, including messages or other interface actions, through the network interface 404 across a local network 420, an Intranet, or the Internet 430. For a local network, computer system 410 may communicate with a plurality of other computer machines, such as server 415. Accordingly, computer system 410 and server computer systems represented by server 415 may form a cloud computing network, which may be programmed with processes described herein. In the Internet example, software components or services may reside on multiple different computer systems 410 or servers 431-435 across the network. The processes described above may be implemented on one or more servers, for example. A server 431 may transmit actions or messages from one component, through Internet 430, local network 420, and network interface 404 to a component on computer system 410. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   causing a data import framework of a central monitoring system, to receive through a computer network, heterogeneous status indicators reflecting statuses of remote software applications of a plurality of customer tenants;
   causing the data import framework to transform the heterogeneous status indicators by condensing them into a status model comprising a plurality of generalized status values;
   loading the status model into a data repository in the central monitoring system; and
   displaying status of the remote software applications based upon the status model, wherein the heterogeneous status indicators have been extracted from the remote software applications and transformed into an application-specific model, by respective data extractors of the plurality of customer tenants.

2. A method as in claim 1 wherein condensing the heterogeneous status indicators comprises mapping to a status table.

3. A method as in claim 1 wherein the heterogeneous status indicators comprise a backlog of tasks to be fulfilled by the remote software applications.

4. A method as in claim 1 wherein the heterogeneous status indicators comprise a number of documents present in specific processing states in the remote software applications.

5. A method as in claim 1 wherein the remote software application comprises an enterprise resource planning (ERP) application, and the heterogeneous status indicators relate to a plurality of business areas in the ERP application.

6. A method as in claim 1 further comprising causing the central monitoring system to communicate information through the computer network to the customer tenant, in response to the status model.

7. A non-transitory computer readable storage medium embodying a computer program for performing a method, said method comprising:
   causing a data import framework of a central monitoring system, to receive through a computer network, heterogeneous status indicators reflecting statuses of remote software applications of a plurality of customer tenants;
   causing the data import framework to transform the heterogeneous status indicators by condensing them into a status model comprising a plurality of generalized status values;
   loading the status model into a data repository in the central monitoring system; and
   displaying status of the remote software applications based upon the status model, wherein the heterogeneous status indicators have been extracted from the remote software applications and transformed into an application-specific model, by respective data extractors of the plurality of customer tenants.

8. A non-transitory computer readable storage medium as in claim 7 wherein condensing the heterogeneous status indicators comprises mapping to a status table.

9. A non-transitory computer readable storage medium as in claim 7 wherein the heterogeneous status indicators comprise a backlog of tasks to be fulfilled by the remote software applications.

10. A non-transitory computer readable storage medium as in claim 7 wherein the heterogeneous status indicators comprise a number of documents present in specific processing states in the remote software applications.

11. A non-transitory computer readable storage medium as in claim 7 wherein the remote software application comprises an enterprise resource planning (ERP) application, and the heterogeneous status indicators relate to a plurality of business areas in the ERP application.

12. A non-transitory computer readable storage medium as in claim 7 wherein the method further comprises causing the central monitoring system to communicate information through the computer network to the customer tenant, in response to the status model.

13. A computer system comprising:
one or more processors;
a software program, executable on said computer system, the software program configured to:
cause a data import framework of a central monitoring system, to receive through a computer network, heterogeneous status indicators reflecting statuses of remote software applications of a plurality of customer tenants;
cause the data import framework to transform the heterogeneous status indicators by condensing them into a status model comprising a plurality of generalized status values;
load the status model into a data repository in the central monitoring system; and
display status of the remote software applications based upon the status model,
wherein the heterogeneous status indicators have been extracted from the remote software applications and transformed into an application-specific model, by respective data extractors of the plurality of customer tenants.

14. A computer system as in claim 13 wherein condensing the heterogeneous status indicators comprises mapping to a status table.

15. A computer system as in claim 13 wherein the heterogeneous status indicators comprise a backlog of tasks to be fulfilled by the remote software applications.

16. A computer system as in claim 13 wherein the heterogeneous status indicators comprise a number of documents present in specific processing states in the remote software applications.

17. A computer system as in claim 13 wherein the remote software application comprises an enterprise resource planning (ERP) application, and the heterogeneous status indicators relate to a plurality of business areas in the ERP application.

18. A computer system as in claim 13 wherein the software program is further configured to cause the central monitoring system to communicate information through the computer network to the customer tenant, in response to the status model.

* * * * *